United States Patent [19]

Koch

[11] Patent Number: 5,546,866
[45] Date of Patent: Aug. 20, 1996

[54] BELLOWS

[75] Inventor: Robert Koch, Bad Sooden-Allendorf, Germany

[73] Assignee: Hubner Gummi- und Kunststoff GmbH, Kassel, Germany

[21] Appl. No.: 516,168

[22] Filed: Aug. 17, 1995

[30] Foreign Application Priority Data

Aug. 18, 1994 [DE] Germany ............................. 9413320 U

[51] Int. Cl.$^6$ ................. B60D 5/00; B61D 17/14
[52] U.S. Cl. ................. 105/8.1; 105/18; 280/403
[58] Field of Search .................... 105/8.1, 15, 18, 105/19, 20, 355, 452, 458; 280/403; 160/84.03, 123, 229.1, 352

[56] References Cited

U.S. PATENT DOCUMENTS

| 2,408,473 | 10/1946 | Nelson ........................................ 105/20 |
| 4,690,421 | 9/1987 | Schmidt et al. ....................... 105/8.1 X |

FOREIGN PATENT DOCUMENTS

| 329031 | 8/1989 | European Pat. Off. ............... 105/452 |
| 562598 | 9/1993 | European Pat. Off. ............... 280/403 |

*Primary Examiner*—Robert J. Oberleitner
*Assistant Examiner*—Kevin D. Rutherford
*Attorney, Agent, or Firm*—Levine & Mandelbaum

[57] ABSTRACT

A crossing apparatus for use with a tunnel-shaped bellows mounted between two vehicles connected to one another in an articulated manner in which an apron bridges a gap between the side wall of the bellows and a turning platform. The apron has folds corresponding to the side walls. It also consists of material strips, two each of which are connected to one another at the longitudinal edges belonging to one another by apparatus of rail-like profiles. The apron-clamping profiles are brought together at their top ends with bellows-clamping profiles of the respective side wall. Each apron-clamping profile has, between its ends, a gap-bridging course located at a corresponding distance from the respective side wall. Each apron is a structural unit comprising a number of apron-clamping profiles and a material web. Each apron-clamping profile forms a frame which is closed in itself from two partial profiles. One partial profile is straight and extends in parallel to the side wall of the bellows. The second partial profile is arc-shaped and is attached at its top ends with straight sections to the first partial profile. The first partial profile of the apron-clamping profile has a groove-shaped cross section, so that it is attached to one of the bellows-clamping profiles. The material web of the apron is folded like the material web of the side walls and is associated with the arc-shaped partial profiles of the extruded profiles of the apron; this material web lies on and follows the contour of the arc-shaped part.

8 Claims, 4 Drawing Sheets

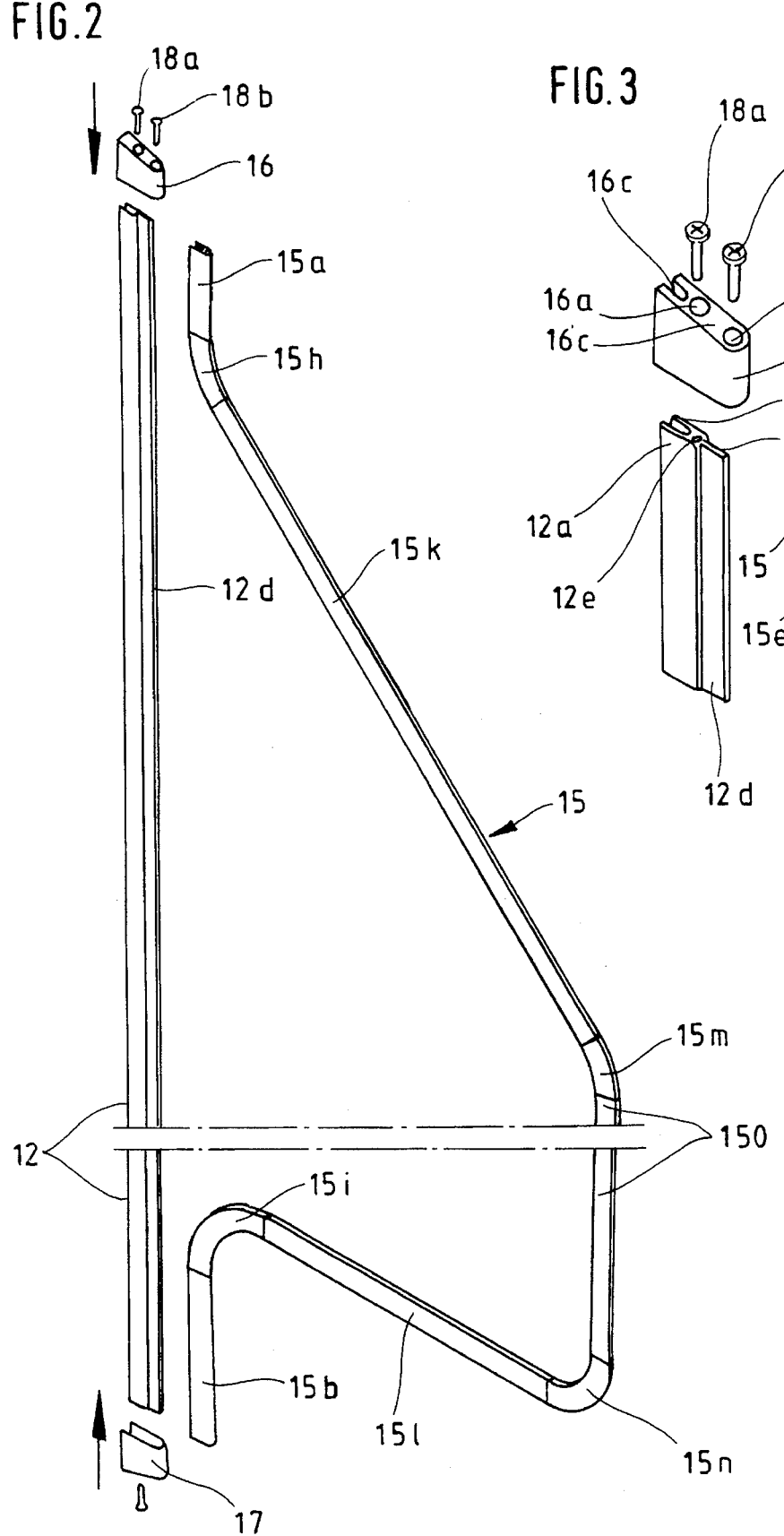

BELLOWS

BACKGROUND OF THE INVENTION

It has been known that crossing apparatus can be arranged between vehicles coupled with one another in an articulated manner in order to enable people to cross over from one of the vehicles to the other. To make it possible for these people to cross unaffected by environmental conditions, it is now generally common practice to surround the crossing apparatus with a crossing protection apparatus. Bellows are most frequently used as crossing protection apparatus.

A turning platform, which is supported on the coupling apparatus and rotates in a cutout, which is surrounded by the floors of the two vehicles coupled with one another, is frequently used as the crossing apparatus in vehicles which must travel through sharp curves. This solution has proved to be successful especially in articulated buses. When traveling through sharp curves, especially on rather bad roads, considerable relative movements are generated between the turning platform and the floor areas surrounding it, as a result of which a considerable gap is necessary between the turning platform or platform and the floor areas surrounding it. This gap represents an appreciable source of hazard, and it must therefore be covered, i.e., it must not be made accessible to people during regular travel. This applies, in particular, to the area between the turning platform and the bellows, because the distance between the turning platform and the bellows can be kept relatively small only in the apex area of the turning platform, and it increases with increasing distance from the apex area. Accepting the gap between the turning platform and the floor cutouts surrounding it as tolerable and limiting the efforts to cover the gap between the turning platform and the side walls of the bellows has therefore become general practice.

A frequently encountered solution to covering the gap is an apron between each side wall of the bellows on one side of the annular gap and the platform on the other side of the annular gap. Measured from the platform, such an apron has a height approximately corresponding to one third of the side wall; it is fastened to the bellows at the top end, and it opens at a short distance above the top side of the platform. To make the apron as unobtrusive as possible, it is folded corresponding to the bellows in some prior-art solutions, i.e., it has the shape of the bellows or of an accordion-type bellows.

The bellows and the apron consist of relatively narrow material strips of coated fabric, and two consecutive strips of material each are connected to one another along two abutting longitudinal edges. The connection is frequently performed by bonding, sewing with clamping frames, and a plurality of these methods are frequently employed additively. The association of an inner or outer frame, though not with each fold, but in a defined sequence, is generally common, so that a plurality of edges with seams or bonded strip edges are followed by an edge which is held in a frame. The bellows can be prevented as a result from changing its contour in an unacceptable manner, especially from sagging between its ends, but, on the other hand, the deformability of the bellows, which is to be required in view of the travel of the vehicle, is not excessively reduced.

SUMMARY OF THE INVENTION

The present invention pertains to the connection between the side walls of the bellows and the aprons when both consist of folded material webs.

The object of the present invention is to design such a connection in a particularly advantageous manner, which specifically means that it shall be able to be manufactured at reasonable expense; that it shall not impair the appearance of the crossing region of the vehicle; and that it shall be able to be installed and removed with minimal work time and technical apparatus, and with minimal manpower.

The features of a bellows according to the present invention, in which these requirements are met, appear from the claims. A bellows according to the present invention will be explained with reference to the drawings. In the drawings,

DESCRIPTION OF THE DRAWINGS

FIG. 2 shows an exploded view of a support frame for associating the apron according to the present invention with a side wall of the bellows;

FIG. 3 shows an enlarged exploded view of the upper connection area;

DESCRIPTION OF THE PREFERRED EMBODIMENT

Figures 1, 1A, 1B:
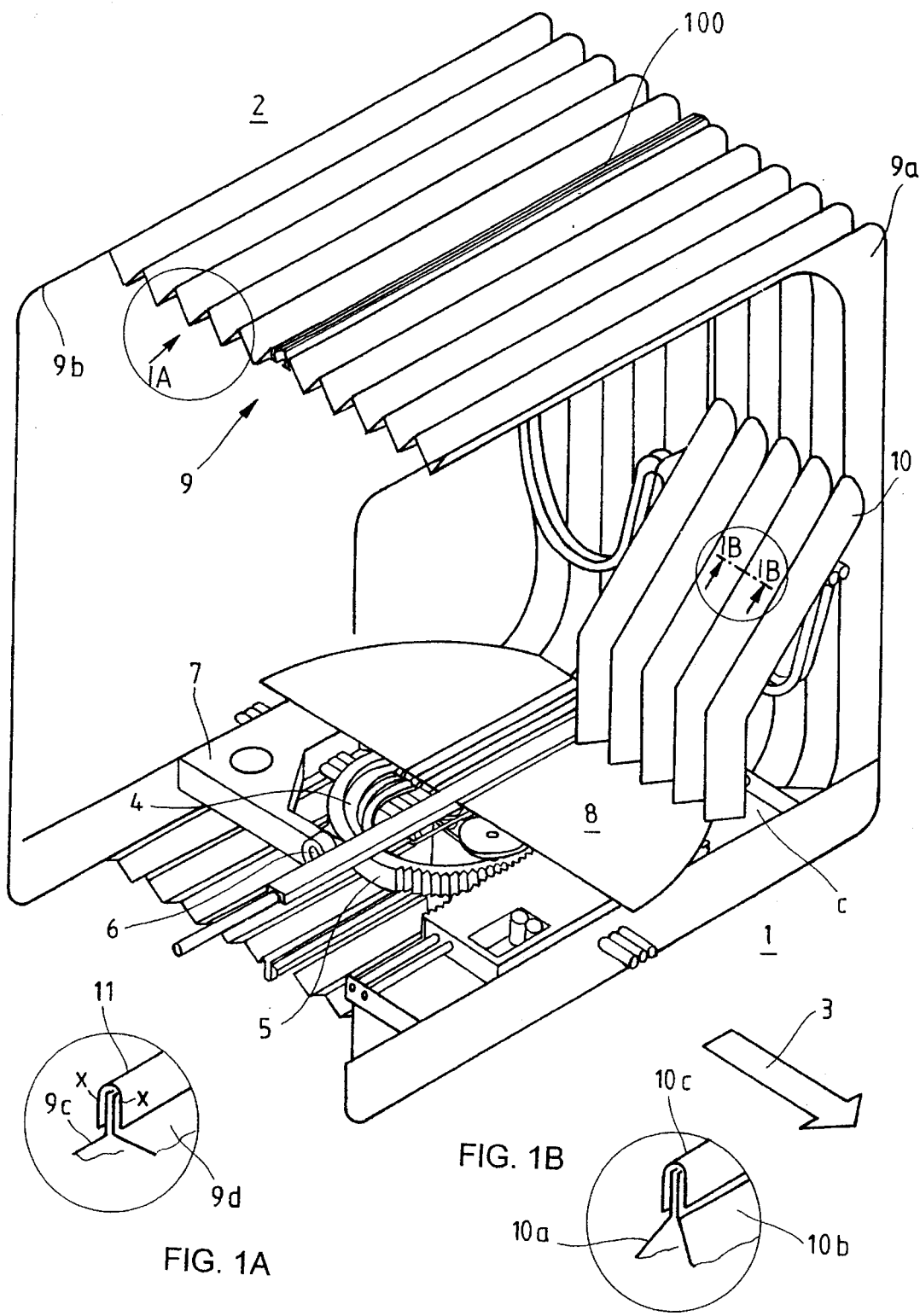
FIG. 1 shows the overall situation in the area between two vehicles connected to one another in an articulated manner, between which a crossing apparatus and a crossing protection apparatus surrounding the crossing apparatus are provided; A and B are enlarged representations of details.
Figure 4:
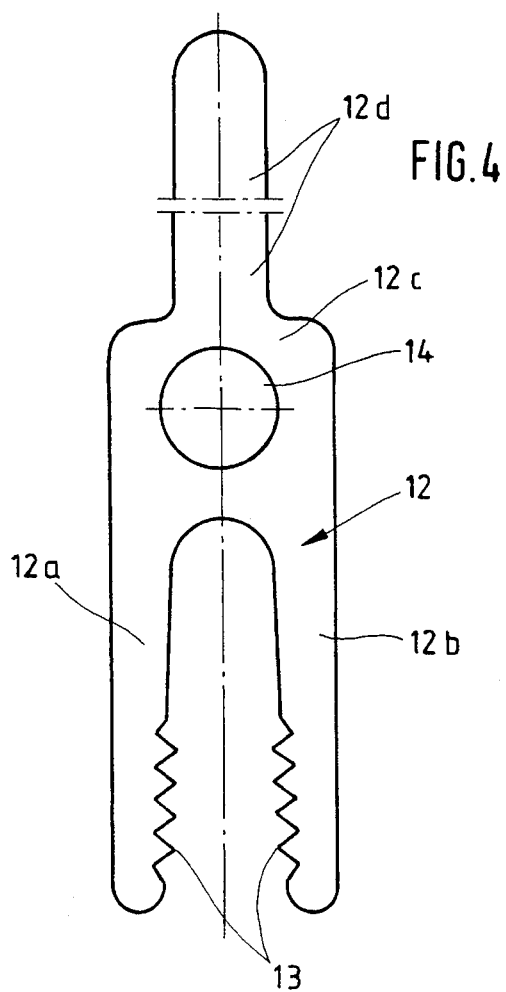
FIGS. 4 and 5 show essential parts of the arrangement according to the present invention as cross sections.

According to FIG. 1, two partial vehicles 1, 2 of an articulated bus are connected to one another by a turntable joint in an articulated manner. The partial vehicle 1 is identified as the front vehicle and the partial vehicle 2 as the rear vehicle by the direction of travel 3. A lower turntable 4 is rigidly associated with the front vehicle 1 in a suitable manner. An upper turntable 5, which is held with lateral pins 6 at the outer ends of the lateral legs of a fork-shaped bracket 7 of the rear vehicle 2, is supported on the lower turntable 4 at the rear end of the front vehicle 1. A turning platform 8, which is located with two sections in a round cutout of the floor, which is defined by the floors of the front vehicle 1 and the rear vehicle 2, is fastened to the turntable joint or to one of its turntables 4 or 5. With the other two circumferential sections, the turning platform is located in front of the inner sides of the side walls of a crossing protection apparatus surrounding the crossing apparatus with the turning platform 8 as the main part in the form of a bellows 9, from which it follows that the width of the gap may be relatively small in the area of the floor sections and of the apex areas of the turning platform closest to the side walls, but it increases greatly from these apex areas to the floor areas, because the distance between the turning platform and the side walls of the bellows rapidly increases from the apex areas located closest to the side wall, as is apparent from FIG. 1 (See area C).

During relative movements between the two turntables 4, 5 around the vertical axis of the joint, when the articulated bus is traveling in a curve, the turning platform rotates about the vertical axis in relation to the floor of the front vehicle 1 and of the rear vehicle 2 as well as to the side walls of the bellows, and a gap of constant width, which is concentric to the vertical axis of the joint, must be provided between the floor and the turning platform 8. The gap, which is variable, as was explained above, is located between the turning platform and the side walls of the bellows.

The turntable joint 4, 5 couples the two partial vehicles to one another in an articulated manner. The turning platform 8 is an essential part of the crossing apparatus, which enables people to cross over between the two partial vehicles 1, 2. To make such crossing over possible without exposure to environmental effects, the crossing apparatus with the turning platform 8 is surrounded by the crossing protection apparatus in the form of the bellows 9, whose ends are fastened by apparatus of end frames 9a and 9b at the front sides of the two partial vehicles facing one another, and they surround passage openings in the front sides. While the arc-shaped gap between the turning platform and the floor of the vehicle can be kept relatively narrow, and no special safety measures must therefore be taken for people crossing over, the annular gap sections between the platform and the two side walls of the bellows represent sources of hazard, each of which is covered by an apron 10. Each apron 10 is fastened to the side wall of the bellows at the top end, and the lower end is located at a small distance above the turning platform 8. The side walls of the bellows and the aprons have, in principle, the same design, i.e., each apron is, like the side wall, a cloth, which is a coated fabric, folded in the manner of an accordion.

The entire arrangement is conventional in this respect, and a description of further details, although represented in FIG. 1, is not necessary. The material webs of the side wall and the apron consist of narrow, consecutive material strips 9c, 9d as well as 10a, 10b, which are connected to one another along the longitudinal edges associated with one another, which may be done by bonding and sewing. At least some of the folds of the side wall, whose number may be regular and consecutive, i.e., e.g., every other fold or every third fold, are held in a rail-like clamping profile 11. This also applies to the apron 10, in which two material webs each are held in a clamping profile 10c in the area of the longitudinal edges. These are preferably inner and outer folded edges, such that the defined circumferential contour of the bellows and the contour of the apron are guaranteed, without the deformability of the bellows corresponding to the relative movements between the two partial vehicles 1, 2 being compromised.

Each of the two identical aprons 10 of the bellows is a prefabricated unit according to the present invention as follows.

A straight rail or a straight extruded profile 12 has the cross section of a groove with the two legs 12a, 12b and with the web 12c connecting the two legs 12a, 12b at one end. The legs are provided with friction-increasing apparatus 13 on the insides of the legs 12a, 12b at the free end facing away from the web 12c. The distance between the insides of the legs 12a, 12b is selected to be such that the extruded profile or the rail 12 can be attached to an inner fold of one side wall of the bellows after completion of the apron, which will be described later; the design of such an inner fold becomes apparent from the above description and from the cutout according to FIG. 1. The web 12c of the extruded profile 12 has a longitudinal hole 14. A strip-shaped lug 12d is made in one piece with the web 12c on the side of the web 12c of the extruded profile 12 facing away from the legs 12a, 12b. Like the sections of the profile 15 to be described later, the extruded profile 12 may be an extruded profile made of a light metal alloy.

Figure 5:
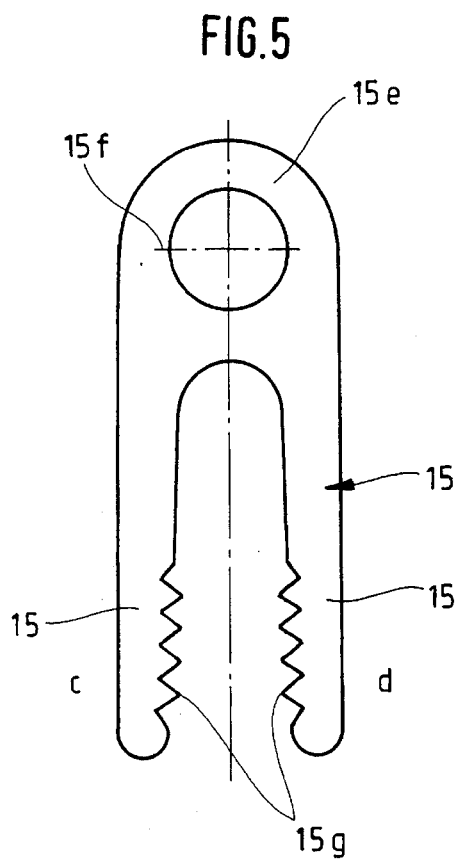
Figure 7:
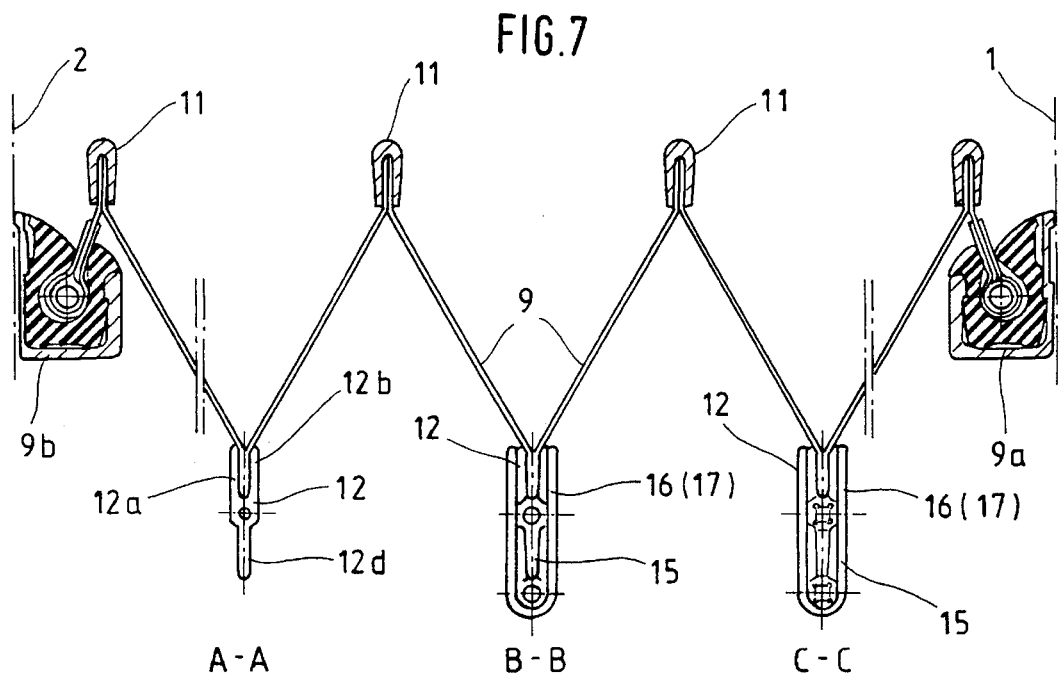
FIG. 7 shows horizontal sections through a side wall of the bellows along lines A—A, B—B and C—C in FIG. 6.

A second rail or a second extruded profile 15 has the shape of a strap. The strap 15 has straight end sections 15a, 15b, which extend in parallel to the rail or the extruded profile 12 for association with the rail or with the extruded profile 12, and whose cross section corresponds to the cross section of the rail or extruded profile 12, providing that the distance between the insides of the legs 15c, 15d is selected such that the strap-like rail or the strap-like extruded profile 15 with its end sections 15a, 15b can be attached to the lug 12d of the rail or of the extruded profile 12, and that a part corresponding to the lug 12d of the rail or of the extruded profile 12 is missing on the extruded profile 15. The extruded profile 15 otherwise also has a web 15d with a longitudinal hole 15f, as well as friction-increasing apparatus 15g on the insides of the free leg ends. The contour of the sections 15a and 15b becomes apparent from FIGS. 3 and 5.

The ends of the end sections 15a, 15b facing each other (FIG. 2) are joined by a respective transition arc 15h and 15i each, and each transition arc 15h and 15i is joined by a straight middle or connection section 15k and 15l, and both connection sections 15k and 15l are connected to a straight section 15o, which is parallel to the end sections 15a, 15b at the ends facing away from the transition arcs 15h and 15i, via additional transition arcs 15m and 15n. The sections 15h through 15o may have, in principle, any cross section. In the installed state, the lower connection section 15l extends at a short distance above the turning platform 8, in parallel to same, i.e., essentially horizontally, while the connection section 15k extends sloping downward as required by the pitch of the top side of the apron 10, as the contour and the dimension of the strap-like profile 15 are determined, in general, especially by the contour and the dimension of the apron 10, and vice versa, the extruded profile 15 determines the contour of the apron 10.

The strap-like extruded profile 15 is attached with its end sections 15a, 15b to the straight extruded profile or the rail 12, especially its lug 12d, and the two profiles 15, 12 are connected to one another. This is preferably performed by apparatus of caps 16, 17, each of which is pulled over the respective upper and lower ends of the two rails or extruded profiles 12, 15, and whose covers have holes and slots, which is explained only on the basis of the upper cap 16, because the lower cap 17 has a corresponding design. The holes 16a, 16b in the cap cover 16c are arranged and designed coaxially with the longitudinal holes 14 and 15f, and the slot 16c is arranged and designed corresponding to the slot between the strips 12a, 12b of the profile or rail 12. Threads are cut in advance in the ends of the holes 14, 15f, so that screws 18a, 18b passed through the holes in the covers of the caps 16, 17 can be screwed into them, after which the two profiles 12 and 15 are connected to one another by apparatus of the screws 18a, 18b and the caps 16, 17, and they form a closed frame.

Figure 6:
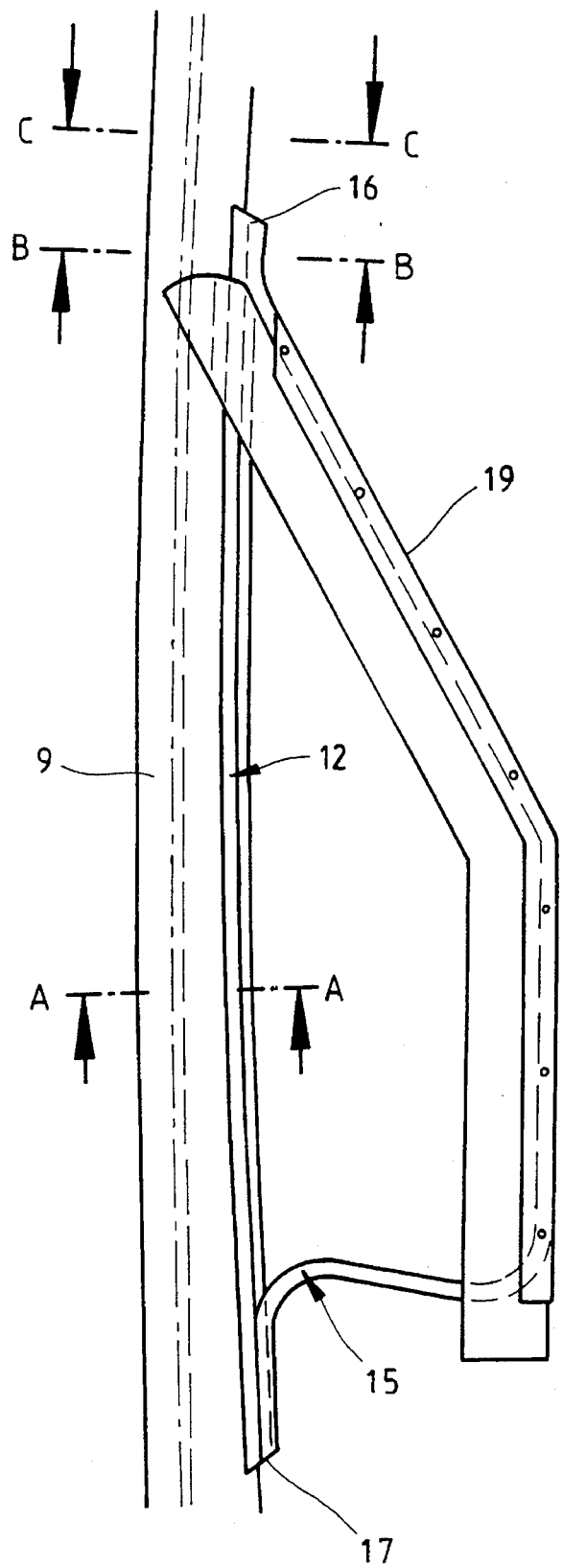
FIG. 6 shows a side wall and an apron after the association of an apron with a side wall.

A number of frames thus assembled is now associated with the folded material web of the apron 10 by placing such a frame into some selected folds of the apron 10, which are open toward the side wall, placing on cover rails 19, and securing them in this position (FIG. 6).

The apron thus assembled is associated with the bellows by attaching the profiles 12 with their legs 12a, 12b, which are thus resilient within limits, via corresponding inner folds of the bellows, and clamping them.

The assembly and disassembly of the aprons are thus possible in a simple manner, without having to use special tools.

The individual apron 10 may extend in one part from one end of the side wall (end frame 9a or 9b) to the other end of the side wall (end frame 9b or 9a), while the bellows 9 may be divided between the ends, and the two partial bellows are connected to one another at the ends facing each other by a middle frame 100.

What is claimed is:

1. Crossing apparatus for use with a bellows acting as a crossing protection apparatus between two vehicles connected to one another in an articulated manner, wherein the bellows has side walls consisting of material strips, two of which are connected to one another at longitudinal edges belonging to each other by a connecting means, said connecting means comprising a rail clamping profile, said crossing apparatus further comprising turning platform means connected between said vehicles, apron means which bridges a gap between each of the side walls and said turning platform, each apron means comprising material strips, two each of which are connected to one another at the longitudinal edges belonging to each other in the area of said rail profiles, said side walls and said apron means having mutually corresponding folds, the profiles of the apron means having upper ends and lower ends connected to the clamping profiles of the corresponding side wall, and intermediate portions between said upper and lower ends in spaced relationship to said side walls for covering said gap, each said apron means comprising a plurality of straight extruded profiles extending parallel to a corresponding side wall of said bellows, a plurality of arc-shaped extruded profiles associated with the said extruded profiles at the upper connection points and a material web, said web being associated with the arc-shaped extruded profiles, each straight extruded profile having first and second side flanges defining a groove therebetween for receiving an inner edge profile of the corresponding side wall of the bellows, the gap to be bridged extending into the area defined by the straight extruded profile and by the section of each arc-shaped extruded profile that is farthest away from the side wall.

2. Crossing apparatus in accordance with claim 1, wherein one extruded profile and one arc-shaped extruded profile associated therewith form a closed frame, said arc-shaped extruded profile being connected to the straight extruded profile at the lower end thereof.

3. Crossing apparatus in accordance with claim 1 wherein each arc-shaped extruded profile has one end section in its upper area which is parallel to the straight extruded profile, and further comprises first and second side walls having a groove therebetween for receiving the straight extruded profile.

4. Crossing apparatus in accordance with claim 1 wherein each arc-shaped extruded profile comprises first and second end sections and an intermediate section disposed between, said intermediate section being parallel to the two end sections and farther away from said corresponding side wall than each of said first and second end sections, an upper connection section disposed between said first end section and said intermediate section and a lower connection section disposed between said second end section and said intermediate section, the lower connection section being disposed above, and in spaced parallel relationship to, the turning platform, the upper connection section extending obliquely to the turning platform, the distance between the first and second ends of the arc-shaped section being substantially greater than the length of the intermediate section.

5. Crossing apparatus in accordance with claim 4, the first end, second end and intermediate sections of the arc-shaped extruded profile are connected to one another by transition arcs.

6. Crossing apparatus in accordance with claim 3 wherein each straight extruded profile and each arc-shaped extruded profile comprises parallel side walls having a groove therebetween and a lug facing away from said straight extruded profile side walls and having a width, the width of the groove in the straight extruded profile corresponding to the width of the inner folds of the side wall of the bellows, the width of the groove in the arc-shaped extruded profile corresponding to the width of said lug, said straight extruded profile being received in the groove of said arc-shaped extruded profile.

7. Crossing apparatus in accordance with claim 5 further comprising first cap means connected to the first end of each straight extruded profile and the first end of its respective arc-shaped profile.

8. Crossing apparatus in accordance with claim 7, further comprising second cap means connected to the second end of each straight extruded profile and the second end of its respective arc-shaped profile.

* * * * *